Jan. 4, 1955 C. W. SISCO 2,698,717
APPARATUS FOR CONTROLLING FLOW OF TAR CONTAINING GAS
Filed Jan. 24, 1951 2 Sheets-Sheet 1
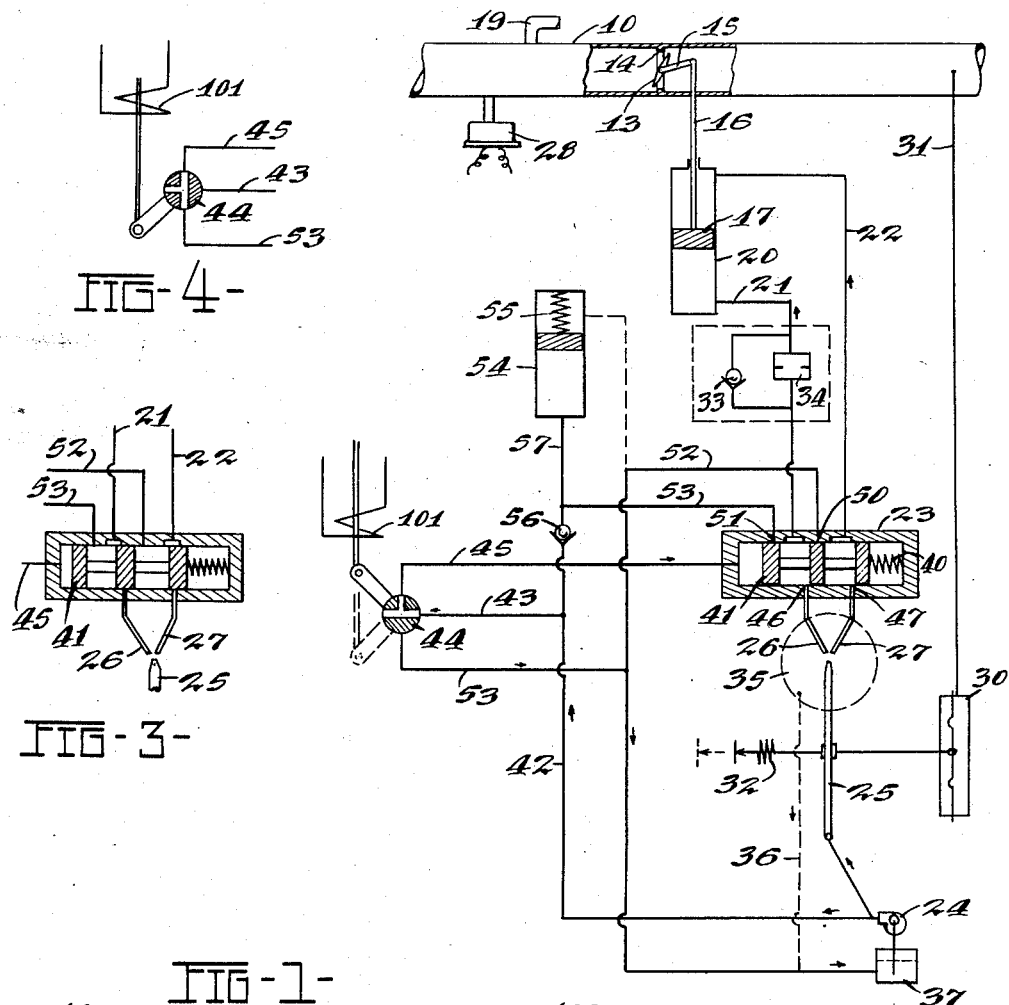
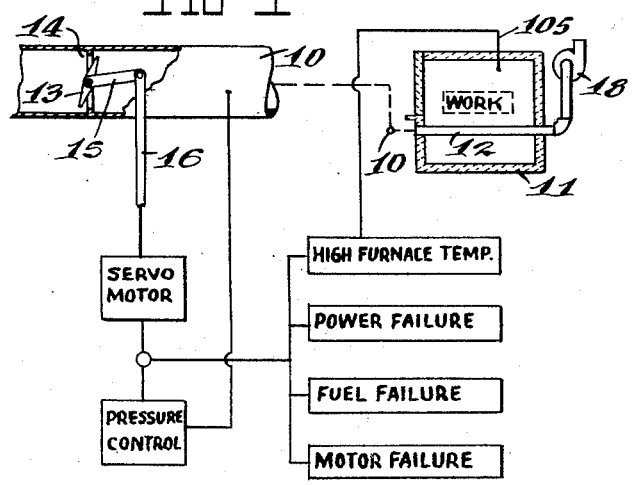
INVENTOR:
C. W. SISCO.
BY
Charles J Lind
ATTORNEY

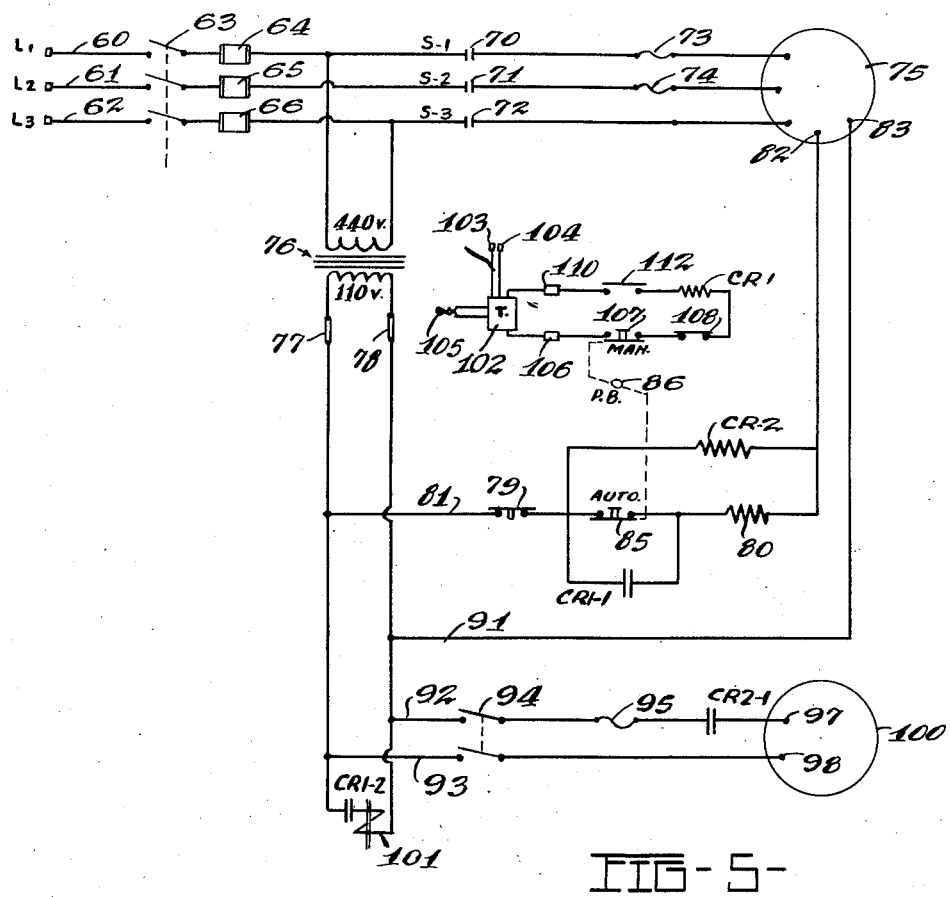

United States Patent Office 2,698,717
Patented Jan. 4, 1955

2,698,717

APPARATUS FOR CONTROLLING FLOW OF TAR CONTAINING GAS

Carl W. Sisco, Toledo, Ohio, assignor to Surface Combustion Corporation, Toledo, Ohio, a corporation of Ohio Application January 24, 1951, Serial No. 207,488

3 Claims. (Cl. 236—15)

This invention relates to the flow control of a dirty, tar containing gas such as coke oven gas. Such a gas normally condenses out tars and the like when passed through a restriction such as a valve, pressure regulator, or other device which has a "wire drawing" effect on the gas. For this reason ordinary regulators and valves cannot be successfully used with such a gas because in a relatively short time (a few days) sufficient tars condense on the mating surfaces of the valve to stick it tight and make it inoperable. Deposits of tars in motor operated valves have been known to so stick a valve that the motor sheared the drive shaft rather than turning the valve.

Where it is desirable to utilize coke oven gas as fuel for industrial furnaces such as radiant tube type annealing covers for steel mills it is necessary to throttle gas flow to regulate pressure, to turn the gas off and on for temperature control and to turn gas off for reasons of safety. It is customary to provide separate valve instrumentalities to perform these functions, but heretofore the use of coke oven gas has been hazardous and impractical at best because the valves and regulators shortly become inoperative. It is the purpose of the present invention to provide a gas control system which avoids these prior difficulties.

For a consideration of what I consider to be novel and my invention attention is directed to the following specification and the concluding claims thereof.

In the drawings:

Fig. 1 is a diagrammatic representation of the invention.

Fig. 2 is a schematic representation of apparatus according to the invention.

Fig. 3 shows a portion of the apparatus of Fig. 2 in a second position.

Fig. 4 shows another portion of the apparatus of Fig. 2 in a second position corresponding to that of Fig. 3.

Fig. 5 shows an electrical control diagram for apparatus of Fig. 2.

Fig. 6 shows a detail view of a valve utilized in the apparatus of Fig. 2.

Referring to the drawings and more particularly to Fig. 1, it is desired to move a valve 13 in a conduit 10 in one of two directions as required to maintain constant a condition of pressure affected thereby downstream of said valve. A relatively powerful fluid operated device or "servomotor" is adapted to move the valve either to close or to open as required and a pressure control device responsive to the condition of pressure is adapted to control the servo-motor to move the valve as required to maintain the desired condition of pressure. The servomotor is adapted to be automatically controlled to positively move said valve in a direction to close the valve as required by any one of several conditions such as: excessive furnace temperature such as determined by conventional on-off firing temperature control means or overheat safety control means; power failure such as 440 volt power to exhaust blowers, combustion air blowers, hydraulic or pneumatic pressure in the control system, 110 volt power failure in the temperature control circuit; fuel failure as indicated by loss of pressure in the fuel supply conduit; or motor failure as indicated by overheating of the motor, "blowing" of a fuse, loss of hydraulic pressure and the like.

The fuel gas conduit 10 leads to a furnace 11 which is heated by conventional gas fired radiant tubes 12 having an exhaust fan 18 therefor, and the valve 13 is of the butterfly type which co-acts with an orifice plate 14 to throttle or substantially stop flow of gas through the conduit. The valve 13 is connected by a crank arm 15 and a link 16 to the operating piston 17 of a hydraulic cylinder 20 which is operated to a first or "closed" position by hydraulic fluid under pressure delivered through conduit 21 and to a second or "open" position by fluid delivered through conduits 22 and 21 respectively. Hydraulic fluid is supplied to the conduits 21 and 22 through a transfer valve 23 by a pump 24 which delivers to a jet pipe 25 and thence to either of two conduits 26 and 27 which lead to the transfer valve. The jet pipe 25 delivers hydraulic fluid to the conduits 26 and 27 and is controlled by a diaphragm regulator 30 which is back loaded to the fuel gas conduit 10 by loading line 31, at a suitable point downstream of the gas valve 13. The diaphragm regulator 30 is spring loaded by an adjustable tension spring 32 in a manner to balance the force on the diaphragm which positions jet pipe 25 and controls delivery of hydraulic fluid under pressure to the conduits 26 and 27 and thence through the transfer valve 23 to conduits 21 and 22 whereby the butterfly valve 13 is continuously adjusted by the hydraulic cylinder 21 to maintain a desired pressure in the downstream side of the fuel gas conduit 10 as measured in the regulator loading line 31. A conventional speed control valve is shown in the closing hydraulic fluid conduit 21 as comprising a check valve 33 and an orifice 34 (which is generally an adjustable valve). Thus the butterfly valve 13 may be fast closing but will be slower opening as is desirable in operation of fuel gas burners. A spray catching chamber 35 and a hydraulic fluid drain line 36 leading to a sump 37 for the hydraulic fluid pump 24 return to the pump fluid which is sprayed from the jet pipe 25 to maintain the desired pressure balance between the conduits 26 and 27.

When the transfer valve 23 is in the "operating" position shown in Fig. 2 a spring 40 in the transfer valve 23 is compressed by the fluid pressure exerted on the compartmented floating cylinder 41 of the valve through conduits 42 and 43 from the pump 24, through the 3-way solenoid valve 44 and through conduit 45 connecting with the transfer valve. When the hydraulic fluid pressure in conduit 45 is released the compressed spring 40 operates the floating cylinder to a second or, "close" position shown in Fig. 3. The floating cylinder 41 in this position closes the transfer valve inlet ports 46 and 47 for the conduits 26 and 27, and thus effectively stops the pressure regulating function of the diaphragm operated jet pipe system, while at the same time opening the ports 50 and 51 of conduits 52 and 53 which lead respectively to the low and high pressure sides of the hydraulic pump 24. Thus the full outlet fluid pressure of the pump 24 is exerted through conduit 53 and port 51 and thence through the close conduit 21 to operate the hydraulic cylinder 20 and close the butterfly valve 10. The open conduit 22 meanwhile drains oil through the transfer valve 23 through ports 50 and conduit 52 to the intake side of the pump 24 via the sump 37. So long as the 3-way solenoid valve 44 is in its open and energized position as shown in Fig. 2, pressure is maintained on the floating cylinder 41 of the transfer valve and it is kept in its open position whereby the jet pipe system may perform its pressure regulating function. When it is desired to stop flow of fuel gas, the 3-way valve 44 is turned to its "closed" and de-energized position as shown in Fig. 4. This may be in response to a temperature control instrument 102 or to various safety features built into the electrical system as will yet be explained. In the "closed," de-energized position, the 3-way valve 44 changes from the pressure conduit 43 to a return conduit 53 which connects through the sump 37 to the low pressure side of the pump 24, thus relieving the pressure acting against the transfer valve spring 40 and allowing that spring to move the transfer valve to the "close" position and thus positively controlling the butterfly valve 10 to a "closed" position. In the event that the hydraulic pump should fail, the pressure acting against the transfer valve spring 40 is relieved even though the 3-way valve should not move to the "close" position. Then a hydraulic accumulator 54 which has compressed its spring 55 through pressure in conduit 42 and a check valve 56 releases its accumulated hydraulic fluid under pressure from its spring 55 through conduits 57 and 53 to port 51 which is now open, thence through "close" conduit 21 to operate the hydraulic cylinder 20 to close the butterfly valve 13. Hydraulic fluid is relieved through conduits 22 and 52 as before described.

The mechanical operation of the butterfly valve in the fuel gas conduit in response to the hydraulic control system is dependent in part upon selection of a valve which characteristically is relatively easy to operate, or which has relatively little tendency to clog with tars from the coke oven gas passing therethrough. The present system benefits from the self cleaning action of the butterfly valve which operates in an orifice and is relatively spaced from the confining conduit walls.

The electrical controls and wiring for the apparatus represented in Fig. 2 are disclosed in Fig. 5 and comprise three main power 440 volt leads 60, 61 and 62 from the power source L-1, L-2 and L-3 connected to a manual gang switch 63, fuses 64, 65 and 66, contacts S-1, S-2, S-3 of a starter coil 80 and coils 73 and 24 of an over-load relay 79 to the motor 75 for the radiant tube exhaust fan 18. Transformer 76 converts 440 volt power to 110 volts which passes through fuses 77 and 78. A lead 81 connects fuse 77 to the overload relay 79 and thence to a thermal overload terminal 82 through (a) a control relay coil CR-2 or (b) the "automatic" contact 85 of a pushbutton switch 86 and the starter coil 80 or (c) the first contact CR1-1 of a control relay CR-1 and the starter coil 80. The other contact 83 of the fan motor thermal overload is connected by a lead 91 to the other side of the transformer 76 through fuse 78.

A pair of leads 92 and 93 connect from the transformer 76 through fuses 77 and 78 to a manual starter switch 94 from which a circuit passes through a coil 95 of the switch 94 thence through a contact CR2-1 of the control relay CR-2 thence to the terminal 97 of the motor 100 for the hydraulic pump 24, and from the terminal 98 of the motor 100 to the manual starter switch 94.

The solenoid coil 101 for the 3-way valve 44 is connected in series with a second contact CR1-2 of the control relay CR-1 across the fuses 77 and 78 of the transformer 76.

A temperature control instrument 102 is operated on a 110 volt power line from terminals 103 and 104 responsive to a thermocouple 105 which is normally disposed in the furnace 11 and is connected through a terminal 106, to a manual contact 107 of the push button switch 86, thence to a high temperature limit contact 108 of the temperature control instrument 102, thence to the operating coil of the control relay CR1, through contact 112 of a gas pressure switch 28 and to the other terminal 110 of the control instrument 102.

The burners for the radiant tubes 12 are gas piloted and fuel gas for the pilots is taken from the fuel gas conduit 10 upstream of the butterfly valve 13 by a conduit 19 so as to be unaffected by its operation.

To "light up" the furnace 11 all gas and electrical connections are first properly made, then the push button switch 86 is placed in the "Manual" position and the manual starter-switch 94 is closed. The hydraulic pump motor 100 will run, and the motor 75 for exhaust fan 18 will run while the butterfly valve 13 will remain closed. The gas pilots for the radiant tubes 12 are then ignited by a hand torch, after which the push button switch 86 is moved to the automatic position. This connects the gas control valve 13 and the burner exhaust fan to the temperature control instrument subject to all safety functions. When the temperature control instrument "calls for heat" the 3-way valve 44 is energized and the butterfly valve is open subject to the gas pressure control system. The exhaust fan is also running. Where the burner system requires it a combustion air blower may be used with or in lieu of the exhaust fan 18.

The butterfly gas control valve 13 closes for safety when:

(a) 440 volt power fails—power through transformer 76 fails, 3-way valve 44 moves to "close" position and the hydraulic accumulator delivers oil to close the valve 13;

(b) 110 volt power fails—the control relay CR1 drops out, opens the contact CR1-2 in the 3-way valve circuit, moving the valve to "closed" position and power from the pump 24 is applied through the transfer valve 23;

(c) The starter overloads 73, 74 or 95 in the circuits to either the exhaust fan motor 75 or the hydraulic pump motor 100 open—the contact CR2-1 in the hydraulic pump motor circuit opens, shutting down the hydraulic pump, moving the transfer valve 23 to "close" position and allowing the hydraulic accumulator 34 to supply oil to close the valve 13;

(d) The motor thermal overload opens—power to the coil of the control relay CR2 is stopped and the system operates as in c above;

(e) Hydraulic pressure fails—the transfer valve 23 moves to "close" position and oil from the hydraulic accumulator operates the piston 17 of the hydraulic cylinder 20 to close the valve 13.

The foregoing system is particularly adapted for use with radiant tube burners, inasmuch as a small amount of gas leakage inherent in a butterfly type valve is not detrimental to the on-off control of the burner system and presents no furnace explosion hazard, and thus a nominal gas shut-off possible with such a valve is sufficient for safety and control purposes. It is noteworthy that in radiant tube firing systems no fuel gas from the burners can leak into the heating chamber, and the firing tubes are always sufficiently ventilated to accommodate small leaks when the fuel valve is automatically turned off. This means that explosion hazards are substantially reduced, and the primary interest in safety fuel shut-off is in reducing furnace temperature through lack of heating fuel. Also, radiant tube burners are customarily gas or electrically piloted or are operated above auto-ignition temperatures of the fuel-air mixture burned so that no pilots are necessary.

From the foregoing it will be appreciated that this invention provides a system for utilizing a powerful servomotor and butterfly valve in a pressure regulating system for dirty (coke oven) gas to perform the gas control functions necessary to on-off type of temperature control in piloted radiant tube heating systems together with certain safety functions incident thereto, thus providing a practical automatic control system for use with coke-oven gas.

Having described my invention, I claim:

1. In an automatic device for controlling the flow of fuel gas to be burned, comprising a control valve adapted to control said flow, a fluid servo-motor operatively associated with said valve for actuating the same, and a fluid system including a fluid circuit and a source of fluid under pressure to actuate said servomotor, the improvement comprising a normally operative gas-pressure sensitive control including gas pressure responsive means for proportioning fluid pressure in the fluid circuit to said servomotor to maintain a predetermined gas pressure downstream from said control valve by urging said control valve toward a closed position when the gas pressure exceeds said predetermined pressure and urging said valve toward an open position when the gas pressure is less than said predetermined pressure, first valve means urged toward an open position by fluid under pressure in said circuit for preventing, when closed, the operation of said pressure responsive means, and resilient means for urging said first valve means toward a closed position in opposition to the action of said fluid and effective to close said first valve means when the pressure of said fluid is less than a predetermined minimum, a fluid accumulator in said hydraulic circuit, and second valve means for admitting fluid under pressure from said accumulator to said servomotor to close said control valve when said first valve means is closed.

2. In an automatic device for controlling the flow of tar-bearing fuel gas to be burned, comprising a butterfly type valve adapted to control said flow, a fluid servo-motor operatively associated with said valve for actuating the same, and a fluid system including a fluid circuit and a source of fluid under pressure to actuate said servomotor, the improvement comprising a normally operative gas-pressure sensitive control including gas-pressure responsive means for proportioning fluid pressure in the fluid circuit to said servomotor to maintain a predetermined gas pressure downstream from said butterfly valve by urging said butterfly valve toward a closed position when the gas pressure exceeds said predetermined pressure and urging said valve toward an open position when the gas pressure is less than said predetermined pressure, first valve means urged toward an open position by fluid under pressure in said circuit for preventing, when closed, the operation of said pressure responsive means, and resilient means for urging said first valve means toward a closed position in opposition to the action of said fluid and effective to close said first valve means when the pressure of said fluid is less than a predetermined minimum, a fluid accumulator in said fluid circuit, second valve means for admitting fluid under pressure from said accumulator to said servomotor to close said butterfly valve when said first valve means is closed, third valve means for preventing, when closed, the flow of fluid under pressure to urge said first valve means toward an open position, whereby said resilient member closes said first valve means, and control means for closing said third valve means and responsive to a change in at least one of the following control conditions: an increase above a predetermined temperature in a furnace burning the tar-bearing fuel gas, a failure in an electrical power circuit supplying the controlling device, and a failure in the supply of tar-bearing fuel gas, and for opening said third valve means when said control condition is restored.

3. The combination of elements defined in claim 2 in which the change in said control means is actuated in response to an increase above a predetermined temperature in a furnace burning the tar-bearing fuel gas.

References Cited in the file of this patent

UNITED STATES PATENTS

| | | |
|---|---|---|
| 973,798 | McKee | Oct. 25, 1910 |
| 1,797,586 | Peebles | Mar. 24, 1931 |
| 1,979,779 | Tobin | Nov. 6, 1934 |
| 2,004,266 | Beimann | June 11, 1935 |
| 2,010,420 | Simmen | Aug. 6, 1935 |
| 2,283,007 | Krogh | May 12, 1942 |
| 2,323,927 | Mercier | July 13, 1943 |
| 2,324,516 | Kalin | July 20, 1943 |
| 2,613,034 | Weise | Oct. 7, 1952 |

OTHER REFERENCES

Eckman, "Principles of Industrial Process Control," by D. P. Eckman, published in 1945 by John Wiley and Sons, pp. 194–196 and 203.